United States Patent [19]

Ganapathi et al.

[11] Patent Number: 5,654,850

[45] Date of Patent: *Aug. 5, 1997

[54] CARBON OVERCOAT WITH ELECTRICALLY CONDUCTIVE ADHESIVE LAYER FOR MAGNETIC HEAD SLIDERS

[75] Inventors: Srinivasan K. Ganapathi, Goleta; Tim O. Cheung, Santa Barbara; Paul D. Frank, Santa Barbara; Robert B. Love, Santa Barbara; Allan F. Rice, Santa Barbara; Paul W. Smith, Santa Barbara, all of Calif.

[73] Assignee: Applied Magnetics Corp., Goleta, Calif.

[*] Notice: The term of this patent shall not extend beyond the expiration date of Pat. No. 5,336,550.

[21] Appl. No.: 286,935

[22] Filed: Aug. 8, 1994

Related U.S. Application Data

[63] Continuation-in-part of Ser. No. 63,282, May 18, 1993, Pat. No. 5,336,550.

[51] Int. Cl.⁶ .................... G11B 5/60; G11B 5/187
[52] U.S. Cl. .................. 360/103; 360/122; 428/216; 428/336; 428/408
[58] Field of Search .................... 360/103, 102, 360/122, 126; 428/216, 336, 408

[56] References Cited

U.S. PATENT DOCUMENTS

| | | | |
|---|---|---|---|
| 3,154,707 | 10/1964 | Bright | 310/166 |
| 3,505,818 | 4/1970 | Cross et al. | 60/242 |
| 3,562,620 | 2/1971 | Haslehurst | 318/616 |
| 3,568,907 | 3/1971 | Watson | 226/97 |
| 3,802,523 | 4/1974 | Clark | 177/146 |
| 3,905,215 | 9/1975 | Wright | 73/382 R |
| 4,402,341 | 9/1983 | Reip | 137/489 |
| 4,419,704 | 12/1983 | Radman et al. | 360/102 |
| 4,523,133 | 6/1985 | Messenger | 318/7 |
| 4,529,659 | 7/1985 | Hoshino et al. | 360/135 |
| 4,530,021 | 7/1985 | Cameron | 360/103 |
| 4,549,238 | 10/1985 | Ertingshausen et al. | 360/103 |
| 4,555,739 | 11/1985 | Le Van et al. | 360/103 |
| 4,589,036 | 5/1986 | Bertschy et al. | 360/75 |

(List continued on next page.)

FOREIGN PATENT DOCUMENTS

| | | | |
|---|---|---|---|
| 54-023517 | 2/1979 | Japan | 360/103 |
| 55-139625 | 10/1980 | Japan | 360/102 |
| 59-227065 | 12/1984 | Japan | 360/102 |

OTHER PUBLICATIONS

Sanford A. Bolasna, "Air Bearing Parameter Effects on Take–Off Velocity", IEEE Transactions on Magnetics, vol. 26, No. 6, Nov. 1990, pp. 3033–3038.

Lee, et al., "Sputtered Carbon on Particulate Media", IEEE Transactions on Magnetics, vol. 26, No. 1, Jan. 1990, pp. 174–178.

Marchon, et al., "Structure and Mechanical Properties of Hydrogenated Carbon . . . " IEEE Transactions on Magnetics, vol. 27, No. 6, Nov. 1991, pp. 5160–5162.

Watanabe, "Floating Type Magnetic Head", Japanese Patent Abstract 56–107363, Aug. 26, 1981.

*Primary Examiner*—Craig A. Renner
*Attorney, Agent, or Firm*—Knobbe, Martens, Olson & Bear, LLP

[57] ABSTRACT

A slider of the type for use with a rotatable magnetic disk is disclosed. The slider has two ends and a bottom surface which includes an air bearing surface. An adhesive layer and continuous coating of carbon is located on the air bearing surface. A method of sputter depositing this continuous layer of carbon upon the air bearing surface of the slider is also provided. The continuous layer of carbon is crown-shaped and deposited using the sputtering technique. The carbon is directed from a source at the air bearing surface of a slider. A mask is placed between the source and slider so that the carbon is deposited in a crown shape. When the slider is viewed from front to rear the maximum depth of the coating is less than about 6 to 10 nm, while at the ends of the slider the coating depth is near 0 nm. The resistivity of the protective carbon layer is controlled for the additional benefit of protection from damages by electrostatic discharge.

16 Claims, 10 Drawing Sheets

U.S. PATENT DOCUMENTS

| | | | |
|---|---|---|---|
| 4,624,048 | 11/1986 | Hinkel et al. | 360/103 |
| 4,649,448 | 3/1987 | Nakajima | 360/103 |
| 4,681,813 | 7/1987 | Yamada et al. | 360/122 |
| 4,731,683 | 3/1988 | Otomo et al. | 360/122 |
| 4,734,802 | 3/1988 | Higuchi et al. | 360/103 |
| 4,778,582 | 10/1988 | Howard | 204/192.15 |
| 4,779,486 | 10/1988 | Schumacher | 475/5 |
| 4,784,015 | 11/1988 | Schumacher | 74/640 |
| 4,796,127 | 1/1989 | Wada et al. | 360/103 |
| 4,804,016 | 2/1989 | Novacek et al. | 137/625.23 |
| 5,010,429 | 4/1991 | Taguchi et al. | 360/103 |
| 5,079,657 | 1/1992 | Aronoff et al. | 360/103 |
| 5,136,445 | 8/1992 | Zak | 360/103 |
| 5,159,508 | 10/1992 | Grill et al. | 360/103 |
| 5,162,073 | 11/1992 | Aronoff et al. | 216/101 |
| 5,175,658 | 12/1992 | Chang et al. | 360/103 |
| 5,336,550 | 8/1994 | Ganapathi et al. | 360/103 |

# CARBON OVERCOAT WITH ELECTRICALLY CONDUCTIVE ADHESIVE LAYER FOR MAGNETIC HEAD SLIDERS

This application is a continuation-in-part of U.S. patent application Ser. No. 08/063,282, filed May 18, 1993, now U.S. Pat. No. 5,336,550, issued Aug. 9, 1994, entitled Carbon Overcoat For Magnetic Head Sliders.

FIELD OF THE INVENTION

The present invention relates to air bearing sliders which support a magnetic read/write head and which are used in conjunction with a rotating magnetic disk in a magnetic recording disk drive. More specifically, the present invention relates to a method of sputter depositing an adhesion layer and a cross-shaped continuous carbon coating upon the air bearing surface of a slider to reduce the friction between the slider and disk, so as to improve the durability of the slider and disk. The resistivity of the protective carbon layer is controlled for the additional benefit of protection from damages by electrostatic discharge.

BACKGROUND OF THE INVENTION

Rotating magnetic disks of the the found in disk drives utilize a magnetic recording head to read and write the information upon the disk. Typically, the magnetic recording disk is made from a substrate of aluminum having a thin film metal alloy, or other media which acts as the magnetic layer, deposited thereon. A protective layer of carbon is normally then deposited upon this magnetic layer. The carbon layer is used to protect the magnetic layer from wear and corrosion.

The magnetic recording head which is used to read and write the information upon the disk is supported upon a slider. The slider is in turn mounted upon a support arm. The slider itself is typically made of ferrite or a ceramic material such as alumina-titanium carbide or calcium titanate.

When not in use, the slider rests upon the surface of the magnetic disk. During information retrieval and recording, however, the magnetic disk is rotated. When the disk first begins rotating, the slider slides along the surface of the magnetic disk. As the rotational speed of the disk increases, however, a boundary layer of air is formed which causes the slider to lift off of the disk and "fly" above the surface of the disk. The distance of the slider from the disk during flight is approximately 50 nm. When the power to the disk drive is once again shut off, the disk rotational speed gradually decreases, and the slider lands upon the disk, sliding along the surface of the disk until the disk comes to rest.

Several problems arise from the contact of the slider with the disk. First, during start up and slow down of the disk, the slider is sliding directly in contact with the disk surface. This frictional contact causes wear of the disk and slider. The wear of the disk occurs, even though a protective carbon coating is applied to the disk, because of the extreme hardness of the slider material. The excessive wear on the disk reduces the effective useful life of the disk.

Contact between the slider and disk also occurs occasionally when the disk is at full rotational speed. Although the boundary layer of air normally acts to support the slider above the disk, high points (asperities) on the otherwise smooth surface of the disk often cause the slider to make contact with these projections on the disk. When the slider impacts these asperities on the disk, the slider often gouges the disk surface, further degrading the disk surface, as well as causing damage to the head and slider.

Several additional problems, other than wear of the disk and slider, have been identified with the use of prior art sliders. First, during initial rotational start up of the disk, friction between the slider and disk increases the force necessary to rotate the disk. This necessitates the use of large motors to turn the disks. Second, the magnetic poles of the head, made of an alloy of nickel and iron, which are exposed to the atmosphere are sometimes prone to corrosion. This is especially true in the case of magnetoresistive (MR) heads, where the MR sensor is particularly prone to corrosion. The carbon overcoat serves to protect the sensor from exposure to the environment. The corrosion of the magnetic poles and the magnetoresistive sensor interferes with the ability of the transducer to properly read and write the information on the disk.

Recently, one attempt was made to resolve some of the above identified problems. U.S. Pat. No. 5,151,294 discloses a method for forming a protective film of carbon upon the air bearing surface of a slider. This patent discloses a method of frictional carbon transfer wherein some of the protective carbon on a disk is transferred to a slider by starting and stopping the rotation of a disk so that the slider remains in contact with the disk during rotation. As a result of the frictional interference between the disk and slider during the many start/stop cycles, carbon from the overcoat on the disk is transferred to the slider surface.

This prior art method suffers from several disadvantages and incompletely solves the problems described above. First, when the carbon is transferred from the disk to the slider, the placement of the carbon on the slider is random. The random placement occurs because as the carbon transfer takes place, the carbon first begins adhering to the slider in raised spots (as on a microscopic level the slider is not absolutely flat) and in areas of high friction. Once the carbon begins to adhere to the slider in these areas, the remaining portion of the slider surface is then separated from the disk by the thickness of the transferred carbon. This means that carbon is deposited in certain areas of the slider, but not others. Utilizing this prior art method, the air bearing surface of the slider does not become completely covered, exposing the non-covered areas of the slider to corrosive agents. Further, the frictional method of carbon placement does not allow the carbon to be placed in specific thicknesses, nor in specific regions on the slider, as the placement of the carbon is purely random.

Other references, U.S. Pat. No. 5,159,508 to Grill, et al., and U.S. Pat. No. 5,175,658 to Chang, et al., describe the use of a DC biased substrate in an RF plasma deposition apparatus to deposit an adhesion layer and a thin layer of carbon upon the air bearing surface of a slider. These references describe depositing an adhesion layer to a thickness of between 10 and 50 angstroms (i.e., 1 to 5 nm), and a carbon layer to a thickness of 50–1000 angstroms (i.e., 5 to 100 nm) upon the flat surface of a slider. An etching technique is then used to form a patterned area, which includes rails, on the air bearing surface. A solvent is then used to remove the photoresist layer which is used to control the etching.

This prior art method suffers from several disadvantages as well. Primarily, the Grill and Chang references disclose a method by which the protective coating (plus a masking layer as described in the Chang reference), is placed to protect the slider. These layers are necessary to protect the slider during subsequent etching which is done to form the patterned air bearing surface, and from subsequent solvent removal of the photoresist layer after etching.

Unfortunately, this method requires, for practical purposes, the placement of a substantial thickness of coating across the entire slider in order that the sensor not be damaged during the etching process. Further, this method does not allow control over the depth of the coating material across the air bearing surface of the slider. In particular, during the etching and solvent removal steps, which are done to form the patterned surface in the slider and remove a photoresist material, the coating is removed in an uncontrolled fashion. This causes the coating thickness to vary across the air bearing surface of the slider.

Prior to this time, it has also been found extremely difficult to deposit a carbon coating utilizing a sputter technique to a thickness of less than or equal to 20–25 nm with any consistency. The difficulty arises from the fact that when the carbon is so thin, it is not a continuous film, and therefore adheres poorly to the base or substrate material. Very thick carbon films are unacceptable in the context of use with sliders because the placement of any coating upon the air-bearing surface of the slider further separates (remembering that during "flight" the slider is separated from the disk by an air space of as much as 50 nm) the head from the disk during read/write operations. The added separation of 25 nm caused by the addition of the carbon coating by the prior art methods is unacceptable as such a large separation interferes with the ability of the read/write head to operate effectively.

It is noted that the shape of the air bearing surface is important for it determines, at least in part, the flight characteristics of the slider. Prior to this time, the shape imparted upon the air bearing surface of the slider has been made by lapping the surface of the slider. This is a time and labor-consuming method, and is not very exact. In fact, current lapping techniques have a tolerance of only ±0.6 micro inches (i.e., about 15 nm).

The prior art methods of coating placement do not allow selective placement and control over the shape of the coating material. Therefore, any shape imposed upon the air bearing surface of the slider must be done with the lapping technique before the thickness of coating is added with the prior art methods.

SUMMARY OF THE INVENTION

In order to overcome the above stated problems and limitations, there is provided a slider for use with a rotating magnetic disk, the slider having an air bearing surface with a continuous coating of carbon thereon.

Preferably, the coating has a maximum thickness of between 6 and 10 nm. Further, in order to minimize take-off time and interference of the coating with the electrical and magnetic functions of the slider, the coating is crown shaped (i.e., being dome shaped, with a maximum thickness in the center and tapering to a very small thickness at each end) when viewed from end to end. In this form, the coating on the air bearing surface has a thickness of nearly 0 nm at ends of the slider, and a maximum thickness of 6–10 nm midway between the ends of the slider.

The continuous carbon coating substantially reduces the friction between the slider and disk, and reduces wear of the same. The reduced friction also reduces the torque requirement of the motor which is used to rotate the disk. Lastly, the continuous carbon coating protects the magnetic poletips and, the magnetoresistive sensor from corrosion.

In accordance with the present invention, there is also provided a method for forming a protective coating upon the air bearing surface of a slider. In the preferred method, a continuous coating of carbon comprises the protective layer. The carbon is preferably deposited utilizing a slow sputter deposition process in which carbon is directed from a sputtering source toward the air bearing surface of a slider. Utilizing this method, a continuous coating of carbon desirably having a maximum thickness of between about 6 and 10 nm can be deposited upon the air bearing surface of the slider.

To deposit the carbon in the preferred crown shape upon the slider, a masking technique is utilized. In this method, a mask is placed between the sputtering source and the air bearing surface of the slider. The mask comprises a slot in a metal frame. The slot is dimensioned such that its width is slightly greater than the width of the slider, but the slot length is less than the length of the slider. The mask thus appears as a frame which is placed between the sputtering source and the slider.

During the sputtering process, the use of the mask causes the majority of the carbon to land on the surface of the slider in an area corresponding to the hole in the mask. Because the sputtering source, the mask, and the slider are all spaced from one another, some of the carbon which leaves the source at an angle passes through the hole of the mask, and is deposited on the slider beyond the perimeter an area directly aligned with and equal in size to the hole in the mask. The majority of the carbon leaves the source and moves in a direct line to the slider. Lastly, some of the carbon, whether travelling in a direct line or at an angle hits the mask and is prevented from being deposited on the slider. In this fashion, a crown shaped carbon coating is formed on the air bearing surface of the slider, with the majority of the carbon located in the center of the slider and very little carbon located towards the ends of the slider.

In accordance with the present invention, there is also provided a method of depositing an adhesion layer upon the air bearing surface of the slider before the protective carbon coating is deposited. This method preferably comprises sputtering a continuous adhesion layer upon the air bearing surface of the slider desirably to a maximum uniform depth of less than about 3 nm.

These and other aspects of the invention will become apparent from a study of the following description in which reference is directed to the following drawings.

DETAILED DESCRIPTION OF THE PREFERRED EMBODIMENT

Figure 1:
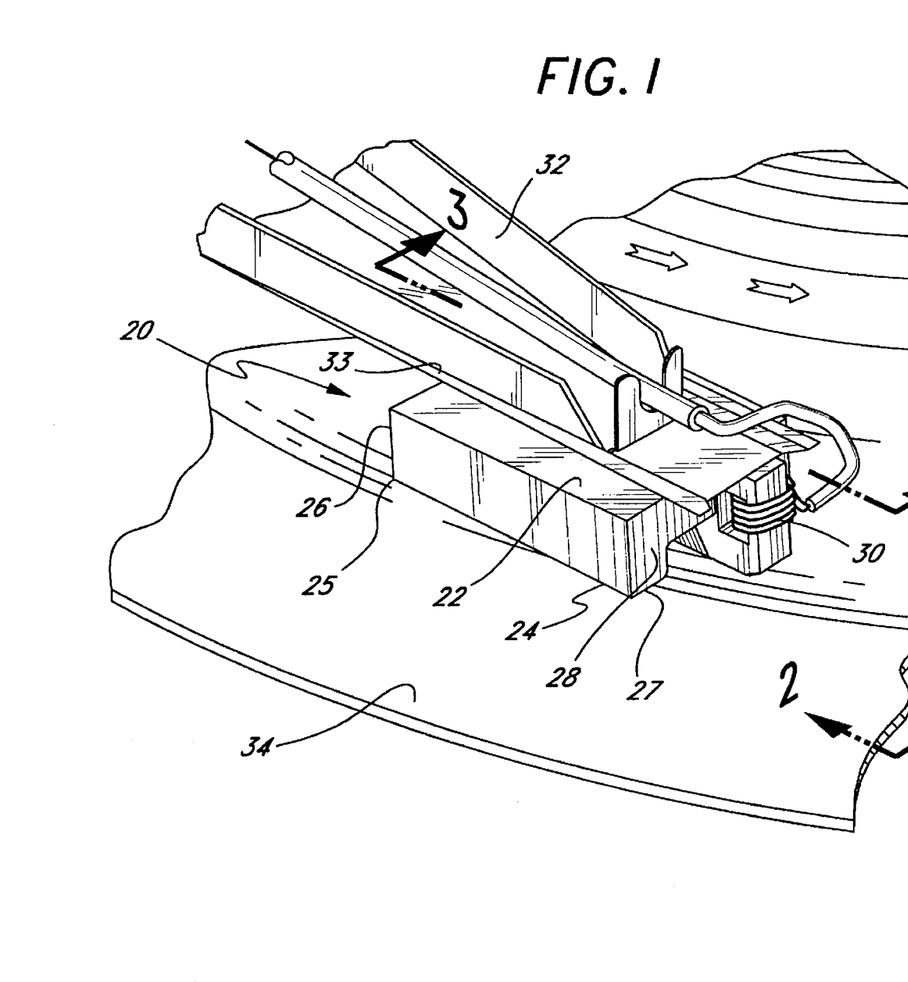
FIG. 1 is a perspective view of a slider of the present invention as used in conjunction with a rotating magnetic disc.

FIG. 1 illustrates a monolithic slider 20 (although it is to be understood that the present invention is equally applicable to thin-film or composite sliders) of the present invention. As illustrated, the slider 20 is primarily rectangular, and has a top surface 22, as well as a bottom surface 24. The bottom surface 24 has a front edge 25 and a rear edge 27. As can best be seen in FIG. 2, the bottom surface 24 is somewhat E-shaped, having two outer rails having planar bottom surfaces which comprise the air bearing surface 29 of the slider 20. The bottom surfaces of the rails are called the air bearing surface 29, as the pressure profile of the air against the slider 20 is such that when the slider 20 is "flying," these surfaces are essentially what supports the slider 20 on its cushion of air. The bottom surface 24 also has a center head area 31, and a recessed area 60 between said center head 31 and outer rails. Referring again to FIG. 1, the slider 20 also has a front end 26 and a rear end 28. A transducer 30 is located on the rear end 28 of the slider 20, and is connected to the center head area 31 as is well known in the art. The slider 20 is supported by and connected to an arm 32 by two flexible leads 33.

Figure 3:
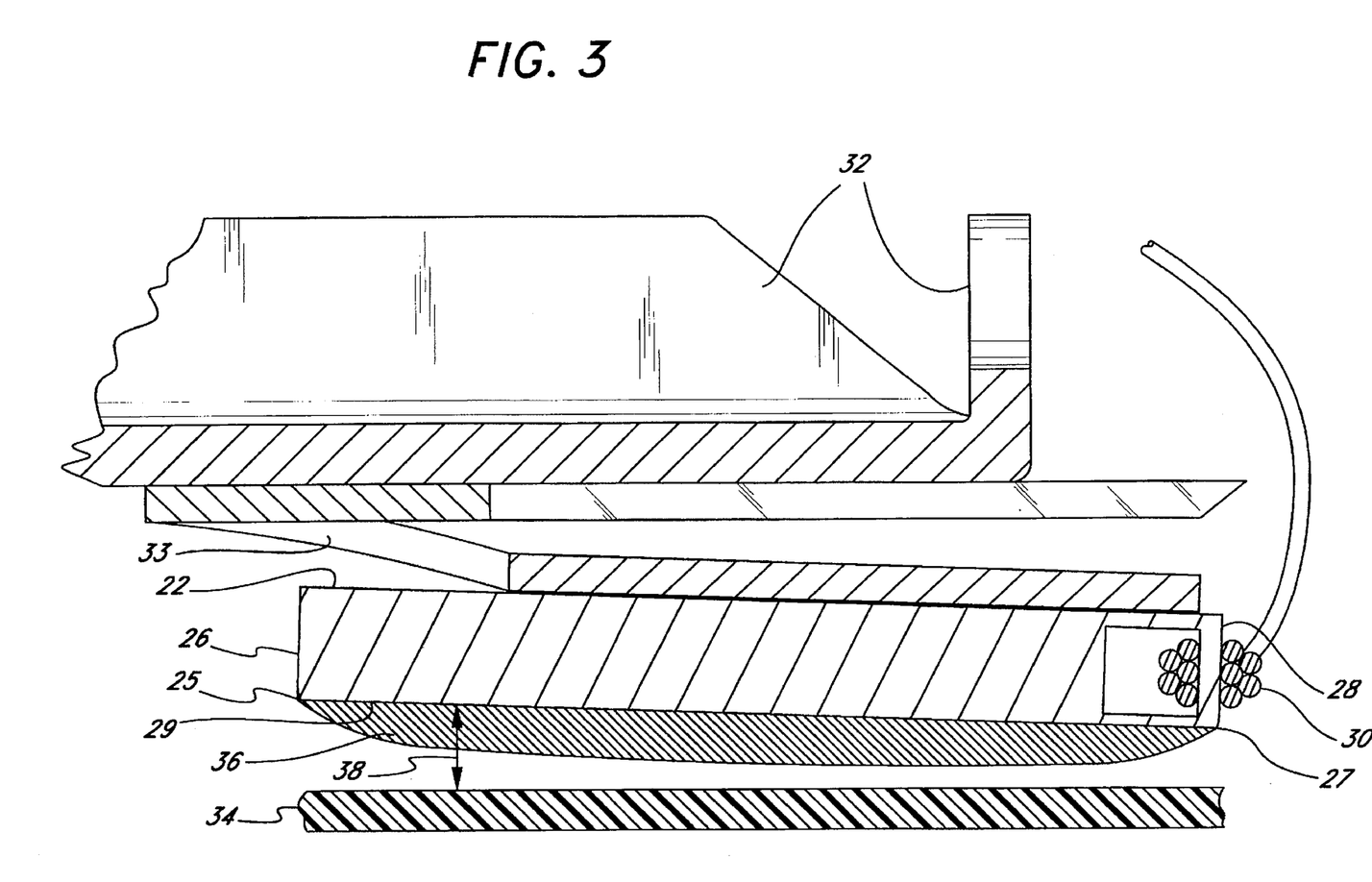
FIG. 3 is a side view of the slider of FIG. 1.

FIG. 3 illustrates the slider 20 as it rides on a cushion of air above a rotating magnetic disk 34. The shape of the slider 20, the characteristics of the boundary layer air flow, and the manner in which the slider 20 is connected to the arm 32 causes the slider 20 to have a pitch to it during "flight." In FIG. 3, this pitch, which is a tilting of the slider 20 from the front 26 downward to the back 28 from a horizontal plane, is exaggerated for clarity. The pitch of the slider 20 during flight is such that the rear end 28 of the slider 20 is closer to the disk 34 than the front end 26.

As discussed above, the durability of the slider and disk are greatly reduced due to friction between the slider and disk during start up of the disk. This frictional resistance also necessitates the use of a large motor to rotate the disk. Further, disk life is reduced because of contact between the slider and disk when the slider is not maintained in "flight" and contacts the disk and there is no protective surface. In order to reduce the friction between the air bearing surface 29 and the disk 34, a coating 36 of friction reducing material is placed on the bottom 24 of the slider 20, including the air bearing surface 29. In the preferred embodiment, the material which comprises the coating 36 is carbon. The material comprising the coating 36 may be, however, any material which exhibits strong adhesion to the slider 20, and which acts to reduce the friction between the disk 34 and slider 20.

FIG. 3 illustrates the importance of keeping the coating 36 as thin as possible, while at the same time, having a thickness which is sufficient to protect the disk 34 and slider 20. As described above, when the disk 34 begins to rotate, the slider 20, which is originally at rest on the surface of the disk 34, becomes airborne, above a certain disk rotational speed. Once airborne, the slider 20 stabilizes at a distance from the surface of the disk 34. At this time the air bearing surface 29 of the slider 20 and the disk 34 are separated by a spacing 38. Because of the pitch of the slider 20, this spacing 38 varies over the length of the air bearing surface 29. Thus, when the slider has a flat air bearing surface and coating thereon, the spacing is a minimum at the rear end of the slider. Likewise, the spacing is a maximum at the front end of the slider.

Importantly, the illustrated slider 20 and its connection to the arm 32 are designed such that the spacing 38 at the rear end of the entire slider 20 is minimized in order that the head can effectively read and write information on the disk 34. At the same time, this spacing 38 is not eliminated, for as the spacing 38 approaches zero, the wear durability of the slider 20 and disk 34 are reduced because of several factors. First, disk 34 topography varies, necessitating some spacing 38. Second, the air bearing modifications made to the slider 20 in order that it will fly low generally increase the time the slider 20 remains on the disk 34 before take-off. Finally, a small spacing 38 results in the slider 20 more frequently contacting asperities in the disk 34.

Importantly, to reduce the wear on the slider 20 and disk 34, the coating 36 is added to the bottom 24 of the slider 20, including the air bearing surface 29, thus limiting the wear problems which occur between the slider 20 and disk 34, especially when the spacing 38 is made optimally small. At the same time, however, the addition of a coating 36 increases the spacing 38, thus affecting the electrical and magnetic characteristics of the slider 20. Therefore, it is important that the coating 36 be as thin as possible, while at the same time thick enough to provide the wear resistance function which is required. It has been found through experimentation that a carbon coating 36 having a maximum thickness of 6 to 10 nm provides this function, and yet is not so thick that it increases the spacing 38 to a point at which the function of the slider 20 is impaired. The thickness of coating 36 which is necessary will vary depending upon the material used for the coating.

Figure 2:
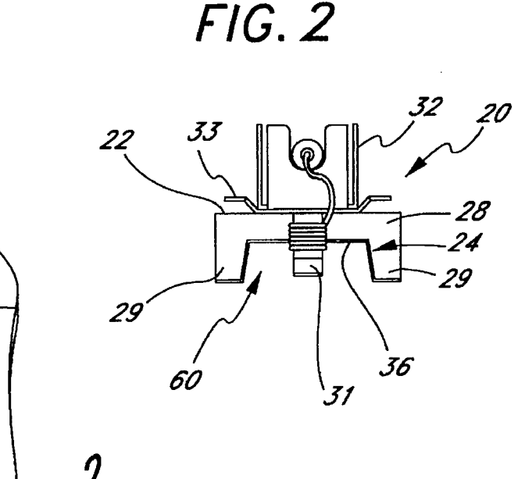
FIG. 2 is an end view of the slider of FIG. 1.

FIGS. 2 and 3 best illustrate the slider 20 of the preferred embodiment, in which a coating 36 is located on the bottom 24 of the slider 20, including the air bearing surface 29. FIG. 2 illustrates the coated slider 20 as viewed from the rear end 28 of the slider 20.

FIG. 3 illustrates the preferred embodiment of the slider 20 of the present invention as viewed from one side. As stated above, in order to protect the slider 20 and disk 34, it has been determined that a coating 36 having a maximum thickness of 6 to 10 nm is preferable. FIG. 3 illustrates the preferred embodiment of the invention in which the coating 36 is placed in a crown shape. It is possible to coat the air bearing surface 29 of the slider 20 with a coating 36 in a layer of uniform thickness. A coating 36 having a uniform thickness of between 6 and 10 nm is also viable, as the continuous coating protects the slider 20 from corrosion, and reduces wear between the disk 34 and slider 20.

While it is advantageous over the prior art to place a coating 36 having a uniform thickness of 6 to 10 nm uniformly across the bottom 24 of the slider 20, including the air bearing surface 29, as stated above, this is not the preferred coating 36 shape. The presence of a 6 to 10 nm thickness coating 36 at the rear edge 27 of the slider 20 where the transducer 30 is located can reduce the magnetic and electric properties of the head. As illustrated in conjunction with FIG. 3, any appreciable thickness of coating 36 at the rear edge 27 of the slider 20 means that the spacing 38 is large. A large spacing 38 is unacceptable as it interferes with the function of the slider 20.

Advantageously, therefore, and as best illustrated in FIG. 3, the coating 36 which is located on the air bearing surface 29 is thicker in the middle, between the ends 26, 28, and is thinner towards the rear end 28, and desirably both ends 26, 28. Preferably, the coating 36 has a crown shape (i.e. arcuate when viewed from end to end, with the thickest or highest point in the middle, and the thinnest or lowest at the ends, and where the thickness does not vary from side to side), wherein the coating is very thin at the front and rear edges 25 and 27 of the bottom 24, including the air bearing surface 29, and where the coating is much thicker in an area between the two ends 26 and 28. A coating 36 having this shape is preferred because the coating 36 acts to protect the slider 20 and disk 34 from damage. At the same time, because there is very little coating 36 at the rear end 28, the magnetic poles (not shown in detail) do not ride as high above the disk 34 as would occur if the coating 36 were uniformly thick. In this manner, the thin coating 36 at the rear end 28 allows the coating 36 to properly protect the air bearing surface 29, and yet at the same time, the spacing 38 between the magnetic poles and disk 34 is not increased to a point at which the function of the slider 20 is impaired.

Further, it has been determined that the crown shape of the coating 36 as viewed from the front edge 25 of the air bearing surface 29 towards the top of the crown, provides beneficial flight characteristics. The crown shape aids in providing lift to the slider 20, thus reducing the amount of time the slider 20 spends in contact with the disk 34 when the disk 34 begins to rotate. Thus, in the preferred embodiment, the coating 36 has a thickness of 6 to 10 nm towards the middle of the slider 20, trailing to near 0 nm at the front and rear edges 25 and 27 at the front and rear ends 26, 28 of the slider 20.

Figure 11:
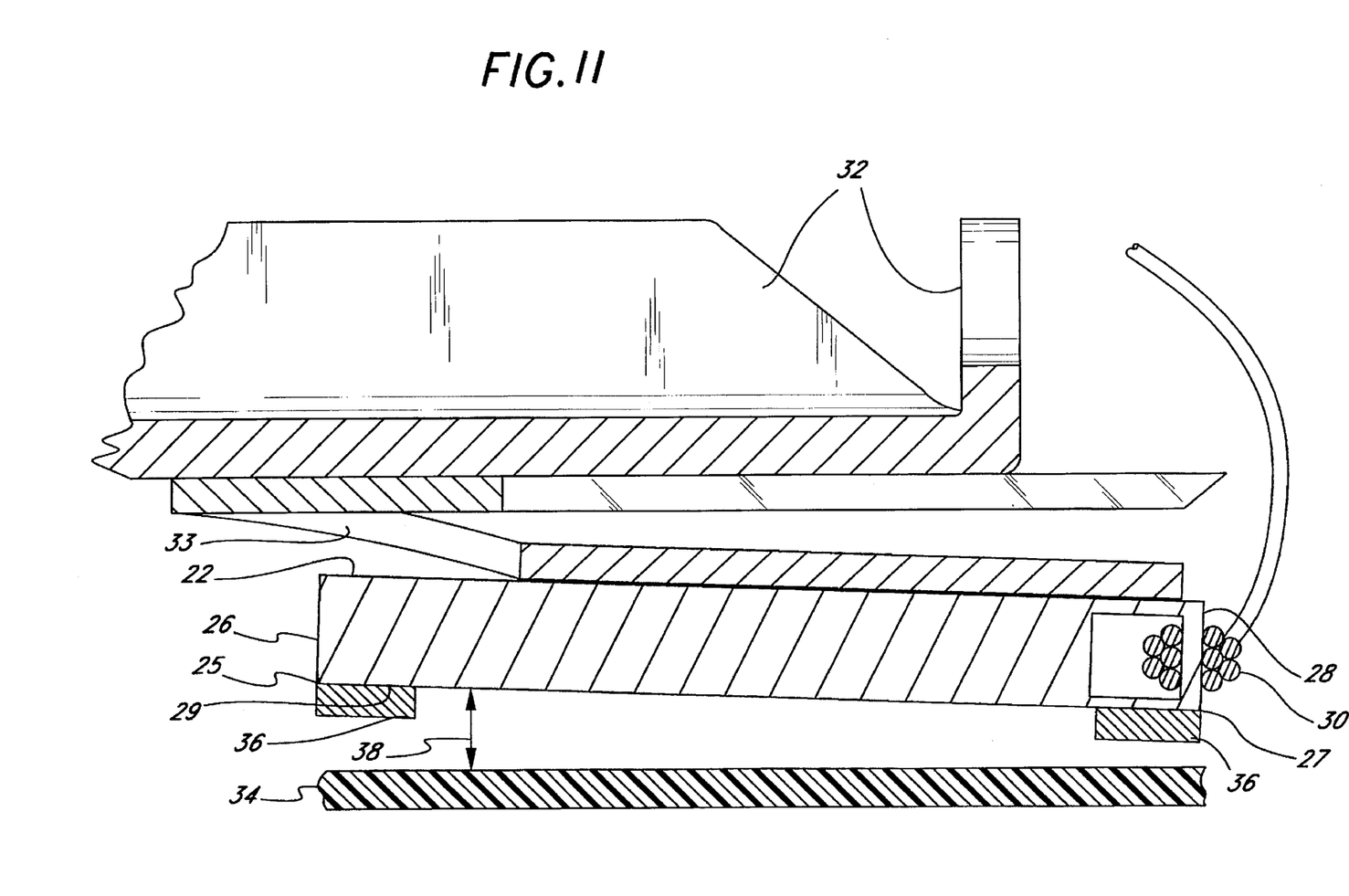
FIG. 11 is a side view of an alternate embodiment coated slider of the present invention.

It is to be understood that while a coating 36 having a crown shape is preferred, there are many other coating shapes which are beneficial, as all such coatings provide friction and wear reducing characteristics. For example, it is possible to place the coating 36 such that most of the coating is located at the four corners of the air bearing surface 29 of the slider 20 (See FIG. 11). While such a coating 36 shape does not provide enhanced flight characteristics, the coating does provide wear reducing qualities while not interfering with the magnetic/electrical characteristics of the slider 20.

The ability to deposit the coating 36 in a crown shape (or other shape) represents a substantial improvement over the prior art. As described earlier, lapping techniques are currently used to adjust the shape of the air bearing surface of the slider. These lapping techniques are quite inaccurate, having tolerances of ±0.6 micro inches (i.e., about 15 nm) at best. The current invention provides for a slider 20 in which the coating 36 is placed on the slider 20 in a crown shape. Formation of the crown in this manner is especially advantageous since it eliminates the need for costly contour lapping of the slider. Further, the crown of the present invention can be placed with an accuracy of ±0.1 micro inch (i.e., 2.5 nm), enabling very precise control over the shape of the air bearing surface 29 of the slider 20, and thus the flight characteristics of the slider 20.

Figure 4:
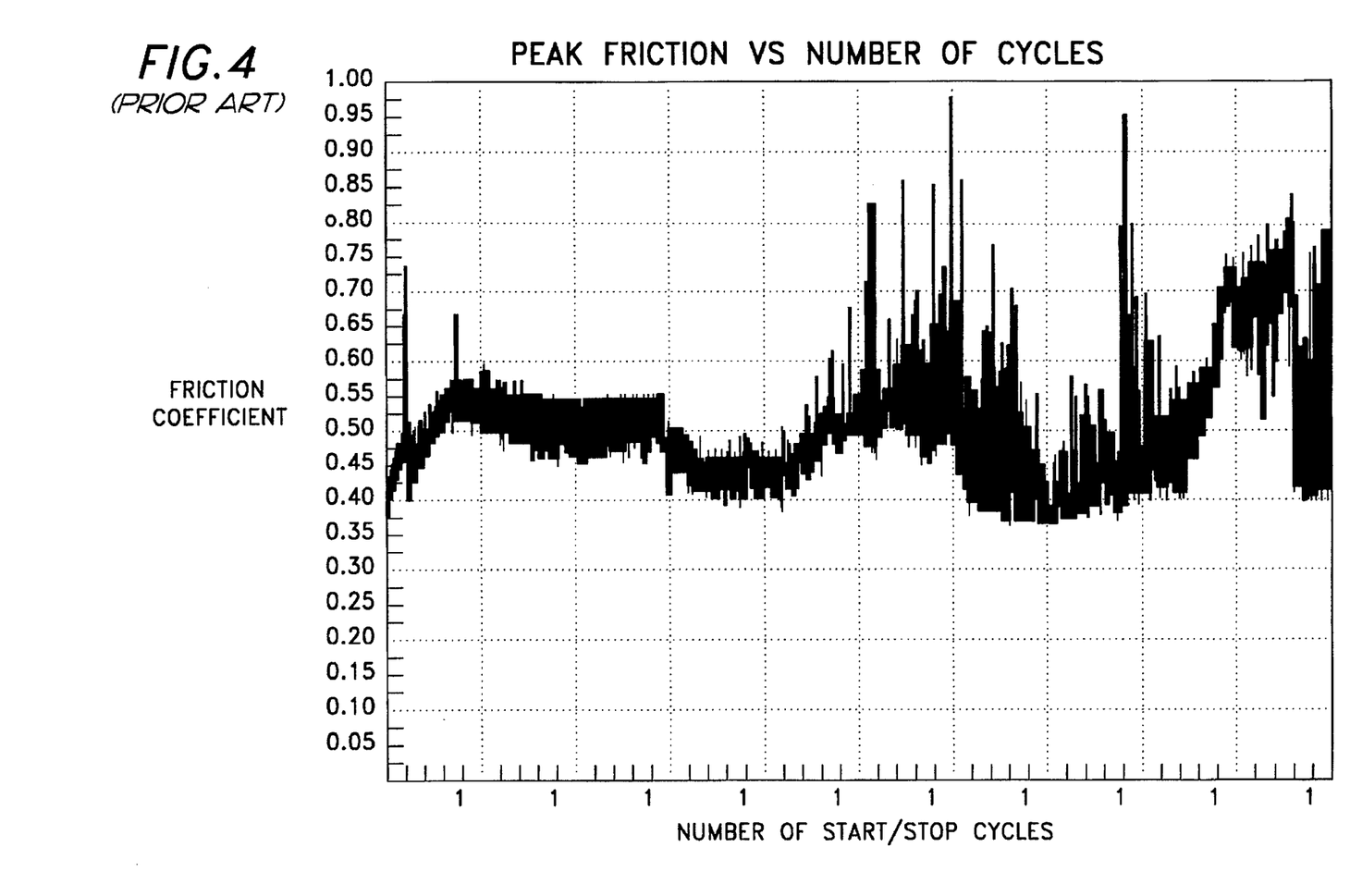
FIG. 4 is a graph illustrating the coefficient of friction between a disk and prior art slider plotted against start/stop cycles.
Figure 5:
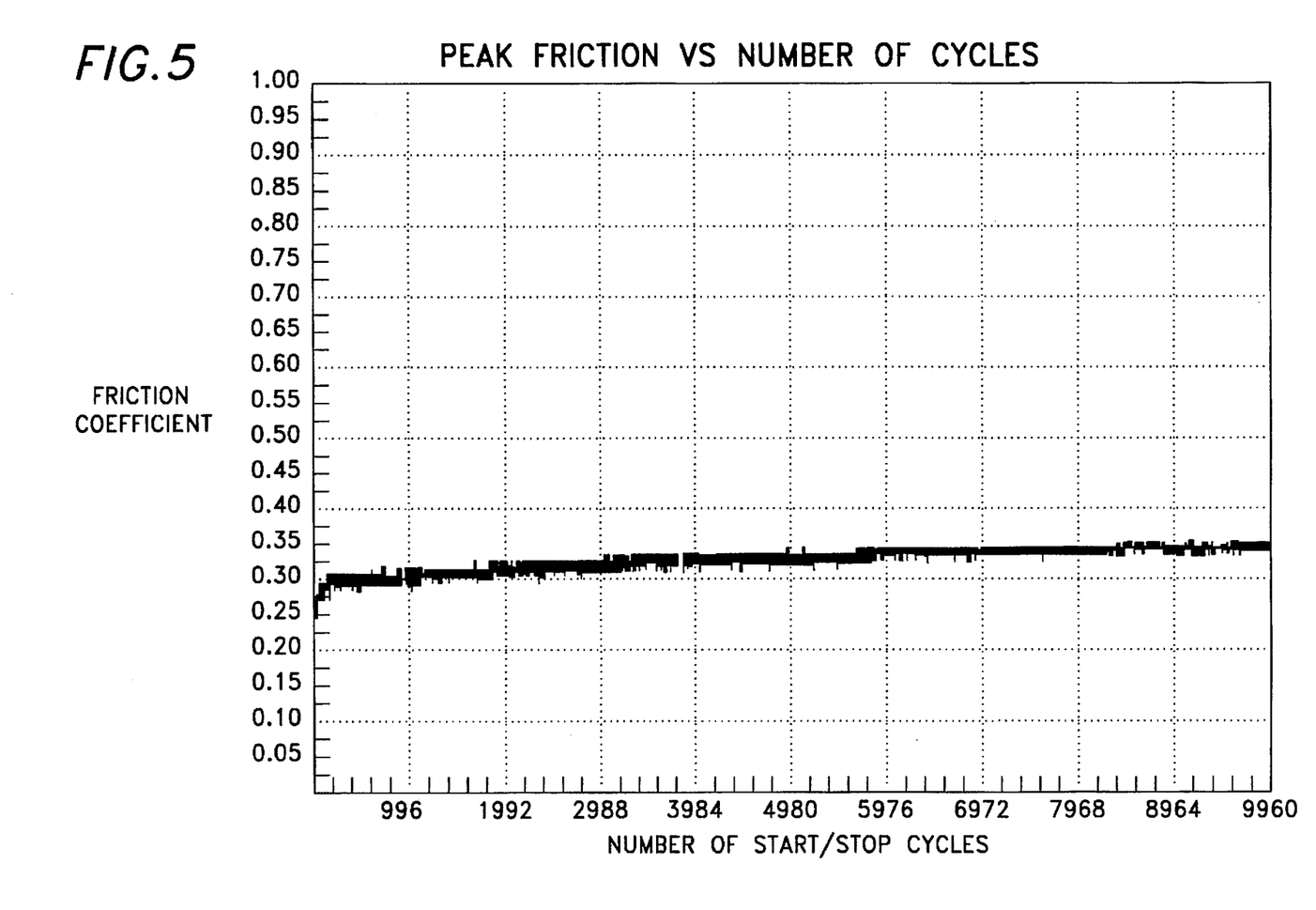
FIG. 5 is a graph illustrating the coefficient of friction between a disk and a slider of the present invention plotted against start/stop cycles.

FIGS. 4 and 5 illustrate the beneficial effect of the coating 36 of carbon on the air bearing surface 29 of a slider 20 over a standard non-coated slider. In order to calculate the frictional coefficient between a slider 20 and disk 34, a strain gauge was connected to the mount on the head. The disk 34 was rotated from a stopped position to a maximum velocity, which was maintained for a specific set time period, and then the disk 34 was brought to rest. This start/stop cycle was repeated and the maximum friction coefficient during each start/stop cycle was recorded as a function of the number of cycles.

FIG. 4 illustrates the maximum friction coefficient per start/stop cycle for a standard non-coated slider. FIG. 5 illustrates the same friction coefficient per start/stop cycle for a slider 20 of the present invention, having a coating 36 of uniform thickness thereon. As can be seen, utilizing a slider 20 of the present invention with a protective coating, the coefficient of friction is reduced by as much as 40%. In addition, the friction coefficient for a coated slider is very uniform over a large number of cycles, unlike that of the standard uncoated slider, which exhibits large fluctuations in friction coefficient. In this case, this is more important than the 40% increase in the average friction coefficient, because the motor torque required corresponds to that needed to overcome the maximum friction, which in this case is almost 2.5 times that for the carbon overcoated slider.

Besides reducing wear on the disk 34 by reducing friction during stop/start of the disk 34, the coating 36 has several other beneficial effects. First, reduction of friction during stop/start of the disk 34 not only reduces wear, but reduces the amount of force needed to rotate the disk 34. Therefore, a motor which consumes less power than might otherwise be possible may be used. This is important in applications such as portable computers where power consumption needs to be minimized.

Wear on the disk 34 caused when the slider 20 drops from its "flying" position to contact the surface of the disk 34 is also reduced. Visual inspection of the air bearing surface 29 of the slider 20, as well as the disk 34, after the friction tests were conducted showed that the coating 36 on the slider 20 of the present invention reduced the wear on these surfaces. Lastly, because the coating 36 which is placed on the air bearing surface 29 is continuous, the coating 36 protects the magnetic poles and the magnetoresistive sensor from corrosion.

While FIGS. 4 and 5 illustrate the beneficial effects of a slider 20 of the present invention over a standard non-coated slider, the slider 20 of the present invention has benefits over the prior art sliders which have coatings which are applied by frictional means. First, as discussed above, the continuous coating 36 of the present invention protects the magnetic poles and the magnetoresistive sensor from corrosion, as the coating 36 protects the entire bottom surface 24 of the slider 20, including the magnetic poles and the magnetoresistive sensor. The prior art coating which is applied through frictional means does not adequately protect the slider from corrosion, as some areas of the air bearing surface are not covered. Further, such prior art frictionally applied coatings (and those in which the coating is uncontrollably etched away during later etching processes) do not allow selective placement of the coating material. In the present invention, the coating 36 is preferably crown shaped to enhance flight characteristics, minimize spacing, and maximize protection of the magnetic poles and the magnetoresistive sensor.

Figure 6:
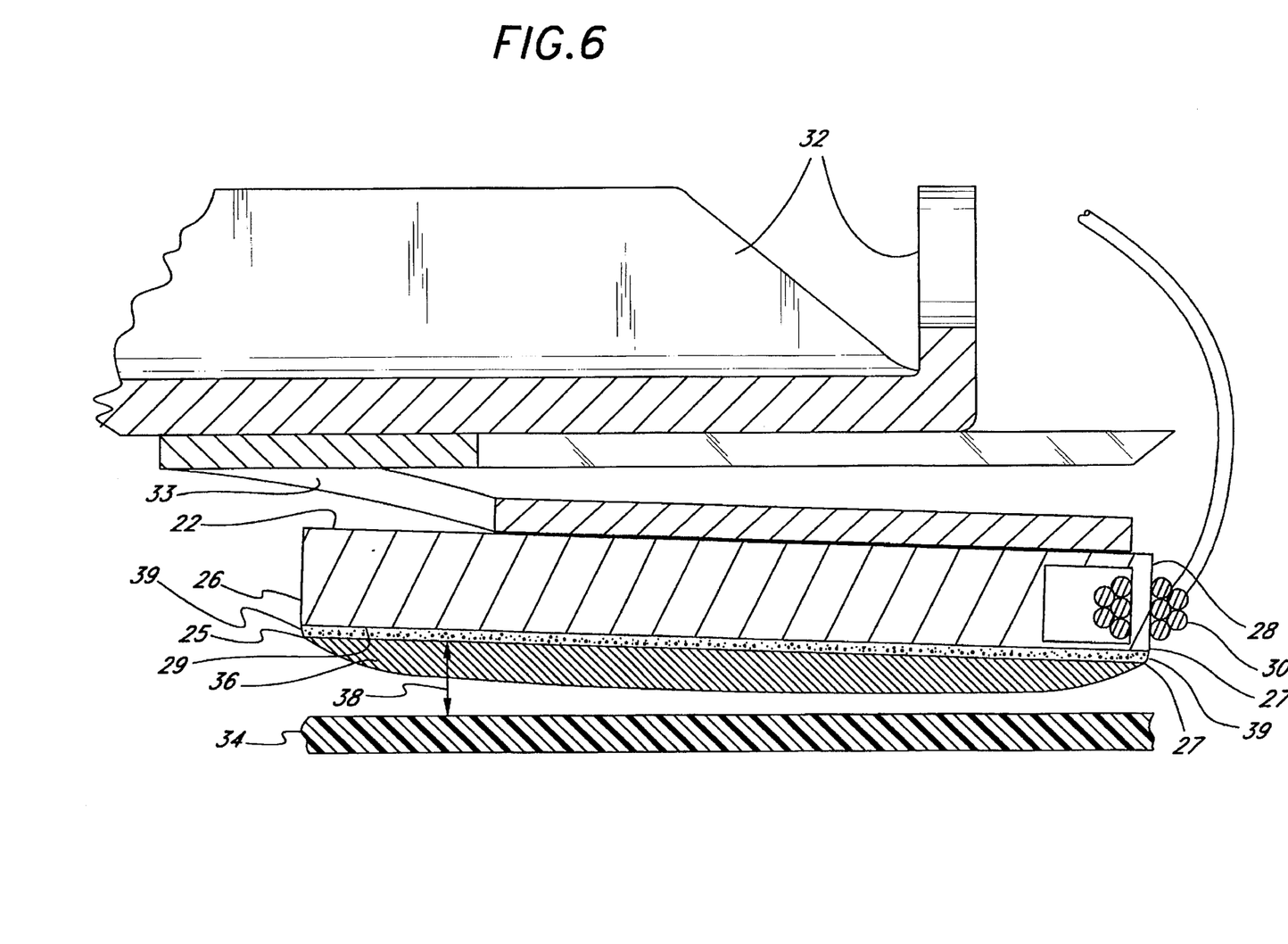
FIG. 6 is a side view of a slider of the present invention with the addition of an adhesion layer.

While it has been found that carbon exhibits strong adhesion to the slider 20 surfaces, it is preferable to have a layer of adhesive material 39, as illustrated in FIG. 6, located on the slider 20 under the coating 36. This layer of adhesive may also be desirable when a coating 36 material is used which does not have the adhesive properties of carbon. When used with carbon, it has been found preferable to first uniformly coat the air bearing surface 29 of the slider 20 with an adhesion layer to a uniform depth of about 2–4 nm, and preferably less than 3 nm. The carbon coating 36 is then located on this layer of adhesive, with the total thickness of both layers being approximately 6–10 nm. The same shape variations of the coating 36 may, of course, be used after the adhesion layer 39 is placed.

Typical disc drive operation involving "take-off", "flight" and "landing" of slider 20 will encounter static and dynamic frictional forces between the air bearing and disc surfaces. It is also well known that contact and friction between insulating materials often produces charge exchange and accumulation, usually leading to electrostatic discharge (ESD). Even a dry air boundary layer during slider 20 flight may be sufficient to induce charge accumulation on slider 20 surfaces. Hence, during manufacturing, handling, and disk drive operation, electrostatic accumulation and discharge near the sensitive head transducer element 30 is a common failure mechanism of considerable concern.

Figure 12:
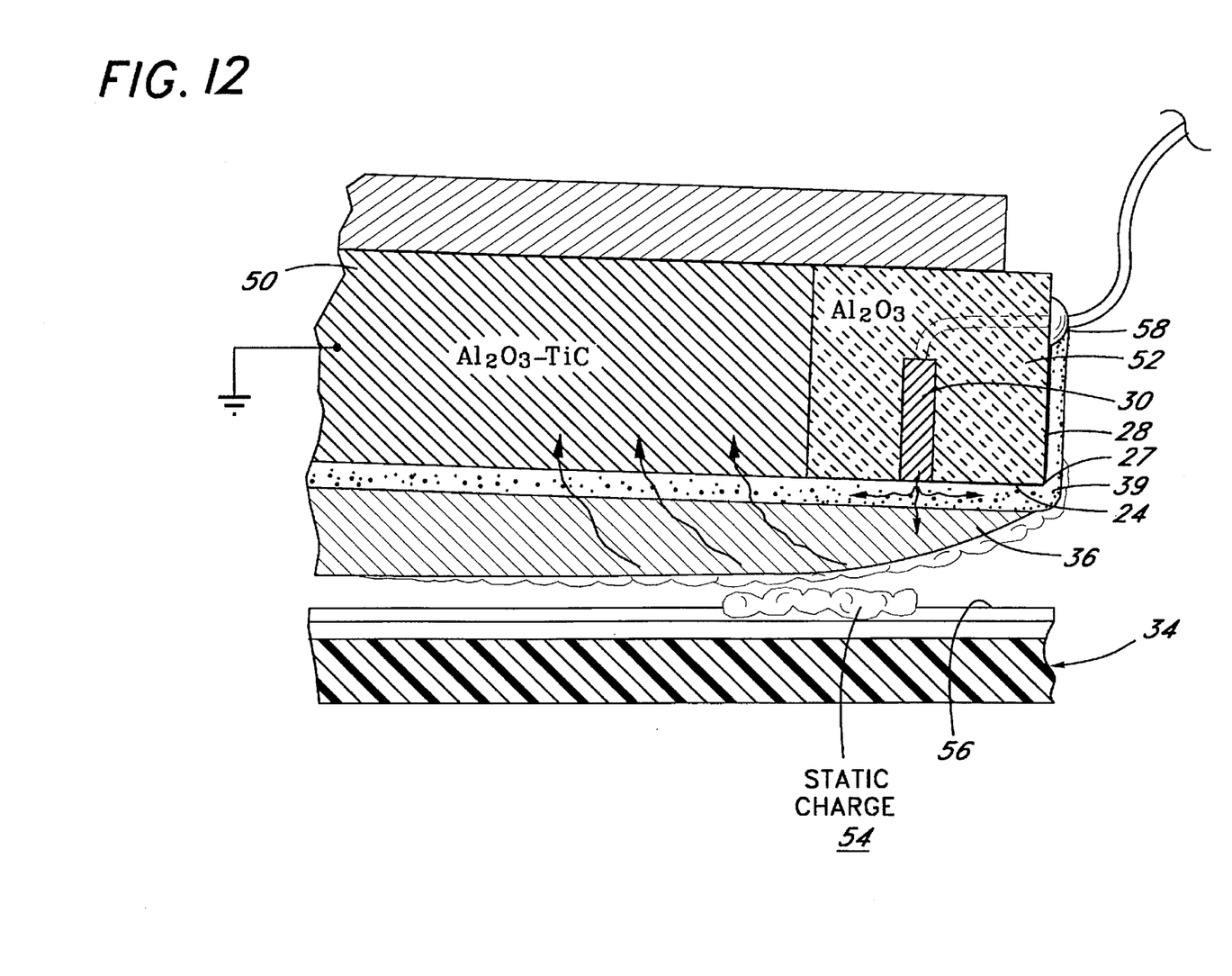
FIG. 12 is a side view of a slider of the present invention, illustrating the accumulation and bleed off of electrostatic charge.

As depicted in FIG. 12, slider body 50 is typically made from a conducting material such as $Al_2O_3$—TiC. The magnetic transducer element 30 is isolated from slider body 50 by an insulating undercoat 52, such as an alumina ($Al_2O_3$) layer about 8 μm thick. During operation, insulating surfaces in the vicinity of head transducer element 30, such as bottom surface 24 and rear end 28 as well as disk surface coating 56 may develop and accumulate electrostatic charge as a result of their close proximity, relative motion, and mutual contact potential. Indeed, very large electrostatic fields, exceeding the dielectric breakdown of the local insulators (including the air boundary layer), may develop between the MR stripe and the conductive magnetic shields on two sides of the stripe and insulated from it within the head transducer element 30, and in the vicinity of head transducer element 30 and nearby conductors, such as slider body 50 or a conducting disc layer. Ensuing ESD causes considerable damage to head transducer 30 as well as surrounding insulating regions 52, 56.

In addition to the aforementioned dynamic and tribological advantages offered by the preferred slider coating 36, ESD is substantially reduced when coating 36 is also electrically conducting and maintained at a constant electrostatic potential. Referring again to FIG. 12, slider coating 36 can be maintained at substantially ground potential through contact with a conducting slider body 50 maintained at ground potential or some other equipotential contact. Thus, electrostatic charge accumulation 54 near transducer element 30 may effectively dissipate via conduction through slider coating 36. In this respect, the central consideration in preventing ESD is to provide for charge dissipation in regions adjacent to transducer element 30. It is now recognized that a preferred slider coating 36 is therefore conducting as well as friction reducing. Furthermore, for thorough charge dissipation, layer 39 preferably covers substantially all of the insulating undercoat 52, as well as the interfacial regions bounding transducer element 30 and bond pads 58.

Unfortunately, friction reducing materials will not often form a sufficiently strong bond with the slider body or the insulating undercoat to withstand the shear forces exerted on them during operation. Specifically, the slider coating 36 should desirably be secured to the slider in a manner which will enable it to overcome operating shear forces of about $50g$ distributed over a slider rail area of 0.6 mm². For this reason, it will often be necessary to utilize an adhesive layer 39 between the slider coating 36, and the slider body and insulating undercoat 52 surrounding the transducer 30. The adhesive layer will create a stronger bond with both the slider coating 36 and the slider body. Further, desirably the adhesive layer will form a strong enough bond with both elements to overcome operating shear forces of about $50g$ over the slider area of 0.6 mm².

While materials such as pure silicon have exceptional adhesive characteristics, it is essentially non-conductive and, therefore, can prevent the dissipation of electronic charge. Other materials, such as chromium, provide both sufficient adhesive characteristics to overcome the applicable shear stress and sufficient conductivity to reduce the level of ESD. On the other hand, as discussed below, it has been determined that it is desirable for the adhesive layer to have a resistance higher than the resistance component of the characteristic impedance of the transducer element. Chromium, unfortunately has a higher conductivity than the resistance component of the characteristic impedance of typical transducer elements. Rarely, will a single inexpensive and easy to work with material provide the desired adhesive characteristics while at the same time have conductivity characteristics within the desired parameters. Therefore, an important aspect of the invention is the provision of a composite adhesive layer and a method for "tuning" the adhesive layer to provide the desired adhesive and electrical characteristics.

A transducer element 30, such as an MR element, often requires bias currents for operation which should not be significantly influenced by contact with an adhesive conductive coating. It is now recognized that a preferred slider coating 36, adhesive layer 39 or a combination thereof should have a resistance higher than the resistance component of the characteristic impedance of transducer element 30, yet low enough to allow dissipative currents at least substantially equivalent to the electrostatic charge generation rate. Typically, an MR element will have a resistance component of impedance of 20–50Ω, in which case the adhesive layer 39 desirably has a resistance in the range of $10^4$–$10^6$Ω, so as to be non-invasive and yet effective for charge dissipation.

The preferred embodiments herein disclosed allow for the selective adjustment of dissipative conduction in coatings 36 and 39 without significantly influencing transducer element 30. In essence, the composition and thickness of materials comprising layers 36 and 39 may be adjusted or "tuned" to provide a desired film conductivity, within certain limits established by head operation. For example, slider coating 36 is preferably comprised of a carbon film, which generally displays a semi-metallic conductivity. While such a film is clearly sufficient to dissipate electrostatic charge accumulation, adhesive layer 39 will, in general, influence charge flow from carbon layer 36 to slider body 50, as depicted by the wavy arrows embedded in layer 39. Selective adjustment of adhesive layer 39 will therefore control the degree of electrostatic charge dissipation. In particular, layer 39 may comprise a thin film of silicon for adhesion, which displays a very low conductivity at room temperature, particularly in the form of a sputter-deposited film. The low conductivity of a pure silicon adhesion layer 39 prevents charge transfer between coating 36 and slider body 50, thereby hindering dissipation of accumulated charge 54. However, if carbon is codeposited during the silicon deposition stage, then conductivity of layer 39 increases roughly with the carbon:silicon ratio, while still maintaining a total adhesive layer 39 thickness of about 2–4 nm and preferably less than 3 nm. The codeposition of carbon with silicon may be accomplished in a variety of ways, preferably sputter deposited, either simultaneously with different deposition rates or in alternating layers with different layer thickness. Alternating layer deposition may for example produce an adhesive layer 39 comprised of 2–10 alternating layers of silicon and carbon, with respective layer thickness substantially given by the desired carbon:silicon ratio. For component layer thickness of approximately the average sputter grain size or less, intralayer granularity and non-contiguous film deposition renders a substantially random distribution of carbon and silicon. Under these conditions, the composite is substantially equivalent to that of a simultaneous deposition procedure. Moreover, it is believed that the conductivity will be determined substantially by the spatially averaged carbon:silicon ratio. A presently contemplated preferred carbon:silicon codeposited layer comprises alternating layers of silicon and carbon, wherein the carbon:silicon ratio lies within an approximate range of 0.3 to 1, with total thickness preferably less than 3 nm.

Accordingly, in a preferred slider coating, adhesion layer 39 serves a dual purpose, and the choice of materials for adhesion layer 39 is important. The carbon:silicon layer 39 herein disclosed is a preferred example of an adhesive layer which also provides electrostatic discharge protection.

Figure 7:
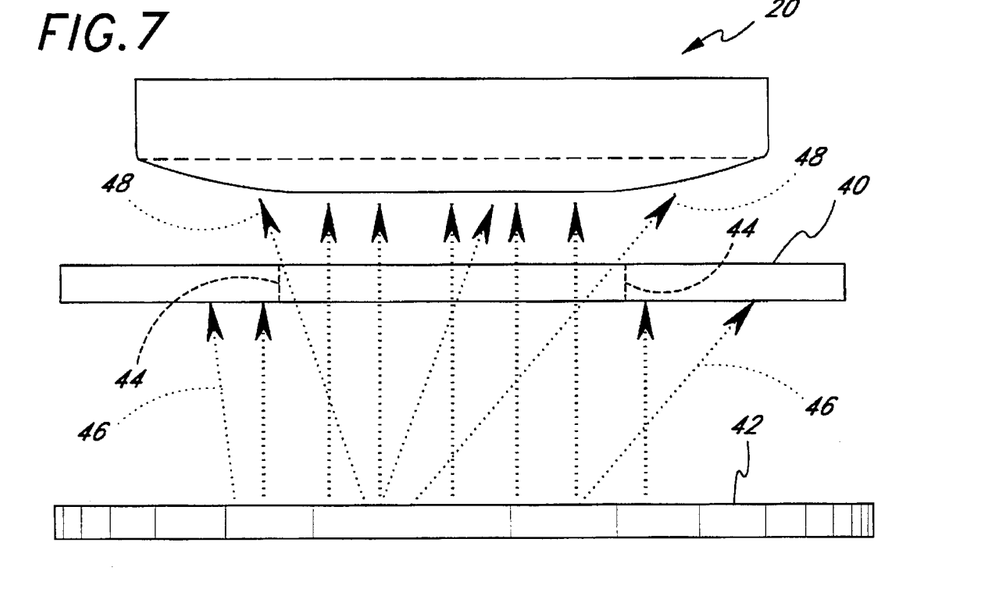
FIG. 7 is a side view of the sputtering process illustrating a sputtering source, slider, and a mask.
Figure 8:
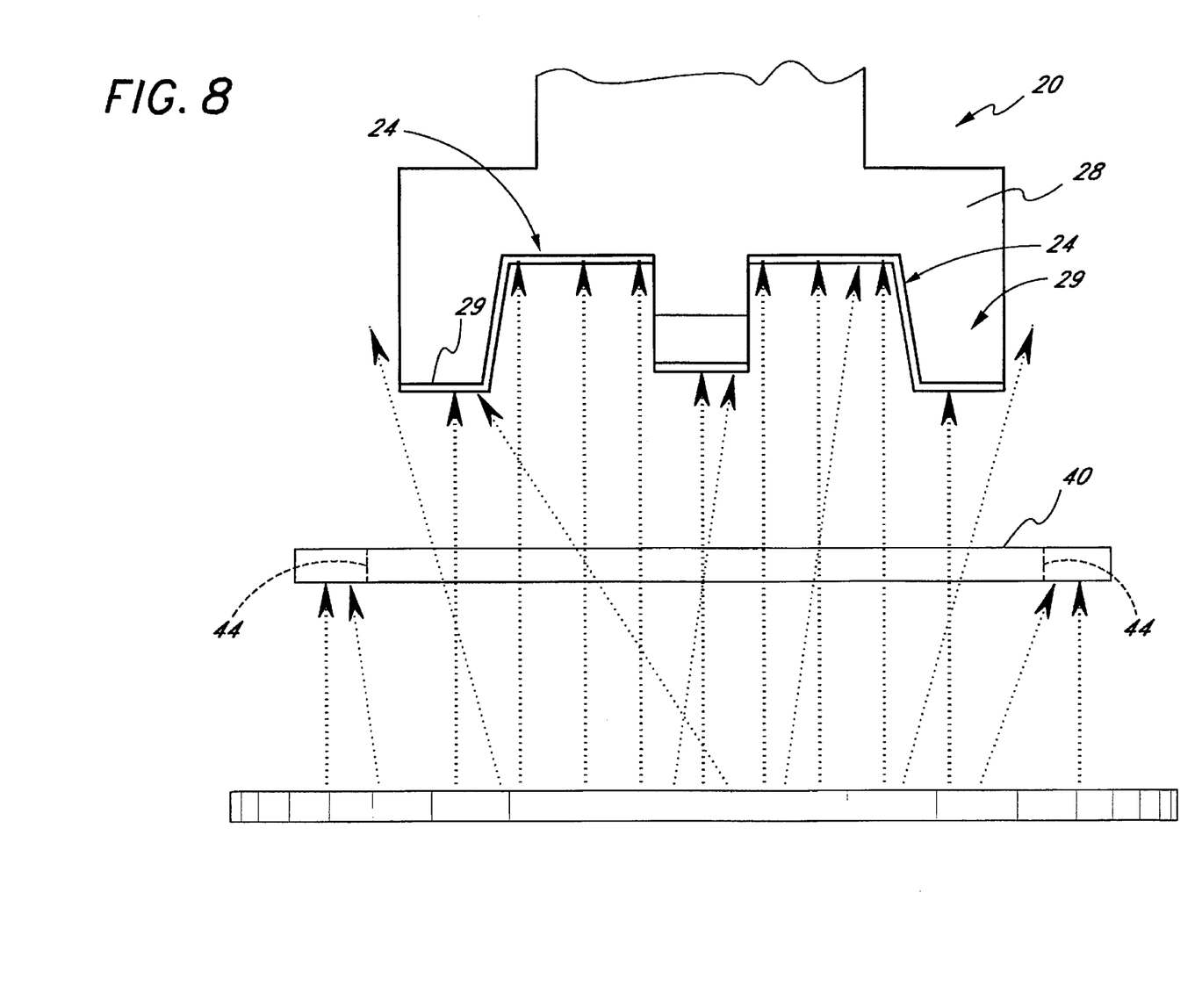
FIG. 8 is an end view of the sputtering process of FIG. 7.

Referring now to FIGS. 6–8, an important aspect of the invention is the improved method by which the coating 36 described above is placed upon the bottom 24 of the slider 20, including the air bearing surface 29. When depositing the preferred coating material 36, carbon, sputter deposition is preferred. In order to achieve a continuous carbon coating having a close tolerance thickness of between 6 and 10 nm, the parameters of the sputtering process are crucial. Preferably, as stated above, carbon is the preferred coating 36 material, and is deposited utilizing a sputtering process. First, the bottom 24 of the slider 20, including the air bearing surface 29, is etched to clean the surface of the slider 20. Similarly, a sputtering source 42 or "target" is similarly etched to clean it.

Next, the friction reducing material, carbon here, is deposited on the slider 20. In order to deposit the carbon on the bottom 24 of the slider 20, including the air bearing surface 29, to a thickness of less than about 10 nm, the deposition process must be controlled with accuracy. Preferably, the following parameters are used during the bias-sputtering process when utilizing an RF diode sputtering system, preferably a Perkin-Elmer II.

| Process atmospheric gas: | Argon; |
| --- | --- |
| Gas pressure: | under 8–10 milliTorr; |
| Power: | under 400 Watts; and |
| Substrate voltage: | −20 to −100 Volts. |

Utilizing these parameters, in order to achieve a coating 36 having a maximum thickness of between 6 and 10 nm, a sputtering time of 20 to 45 minutes is used. (This sputtering rate is over two hundred times slower than that used in previous sputtering methods involving disks, when used to place a coating of a similar thickness.) It is noted that it is preferable to utilize this system in a manner whereby several sliders are involved in the sputter deposition process, the sliders located on a rotating substrate table, as is well known in the art. It is possible to sputter deposit material on the sliders in a static system, however.

In order to control the placement of the coating material onto the air bearing surface 29 of the slider 20, a mask 40 is used. The mask 40 is preferably made of metal, which is then coated with carbon to eliminate redeposition problems during etching. Metal is the preferred mask 40 material, because of cleanliness, heating, outgassing and other compatibility reasons. For the same reasons that metal is the preferred material, the mask 40 should not be made of paper, plastic, or glass. The mask 40 acts to deflect some of the sputtered carbon 46, while allowing some of the carbon 48 to be deposited in certain areas of the slider 20.

Figure 9:
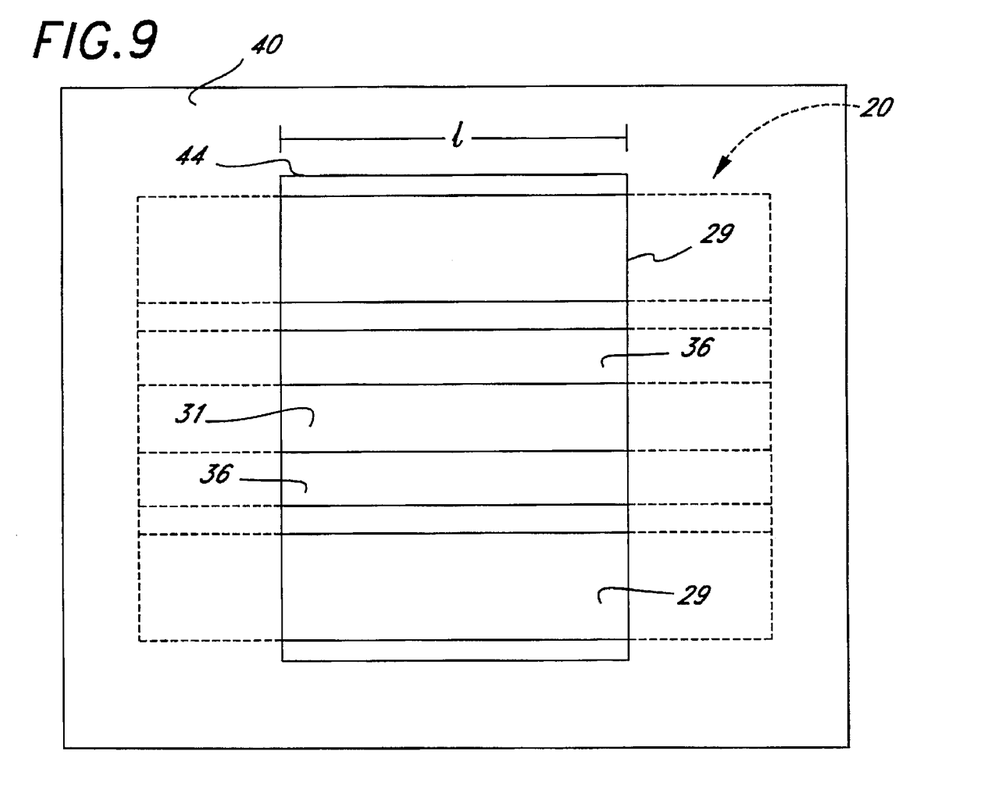
FIG. 9 is a top view of a mask overlying the air bearing surface of a slider during sputtering of a coating upon a slider.

FIGS. 7–9 illustrate the use of a mask 40 to create the preferred crown shaped coating 36 upon the air bearing surface 29. As illustrated in FIG. T, the slider 20 is placed with its air bearing surface 29 facing toward the sputter source 42. As illustrated, the sputter source or "target" 42 is disc shaped. The mask 40 is placed in between the slider 20 and a sputter source 42, a distance of about 0.6 mm being advantageous. In the typical sputtering system, the distance between the source 42 and the slider 20 is typically 1 to 3 inches. It is noted that in a system in which several sliders are located on a rotating substrate table, the mask 40 is located so that each slider moves under the mask during the deposition of the sputtered material.

Figure 10:
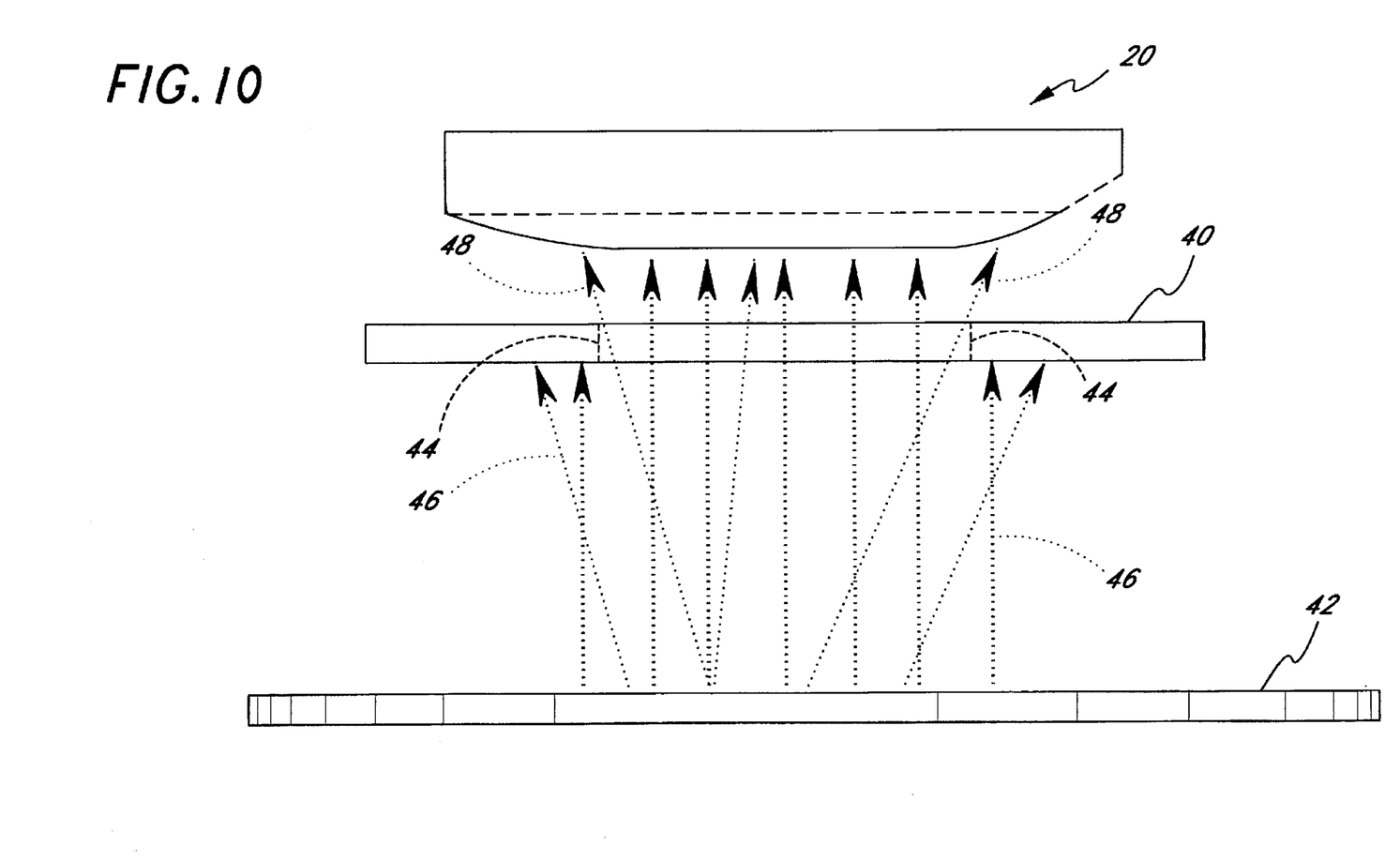
FIG. 10 is a side view of the sputtering process of FIG. 7, when a coating is applied to a slider having a taper at one end.

As illustrated in FIG. 9, the mask 40 has a central opening 44 therein. The length "l" of the opening 44 is less than the length of the slider 20. In this fashion, as carbon is sputtered towards the mask 40, the majority of the carbon travels in a direct line to the slider 20 and is deposited in an area aligned with and corresponding in size to the opening 44 in the mask 40. Some of the carbon (see lines labelled 48 in FIG. 7), however, travels at an angle from the source 42 to the slider 20, meaning that some of the carbon passes through the hole 44 in the mask 40 and lands on the slider 20 in an area outside the perimeter of the area corresponding to the area defined by the hole 44 in the mask 40. Any carbon (see lines labelled 46 in FIG. 7), whether travelling at an angle or in a straight line, which hits the mask 40 is prevented from being deposited on the slider 20. It is noted that, as illustrated in use with a flat slider 20 to form a crown-shaped coating 36, the mask 40 is centered over the slider 20. If, however, as illustrated in FIG. 10, one end of the slider 20 is tapered, the mask 40 is moved away from that end by an amount equal to the tapered length, so that the crown is formed on the remaining flat portion of the air bearing surface 29 of the slider.

As best seen in FIG. 7, use of a mask 40 having the above described shape creates the crown shape because of the way the carbon travels from the source 42 to the slider 20. Using such a method, the majority of the coating material travels in a straight line through the hole 44 and is deposited on the slider 20. A small amount of the carbon or coating material, however, travels at an angle from the source 42 to the slider 20. Some of this carbon passes through the hole 44, thus landing to the outside of the area corresponding to the opening 44 in the mask 40. In this fashion, a very small amount of coating 36 is deposited at the ends 26 and 28 of the slider 20, while the majority of the carbon is deposited in the center of the slider 20, thus creating the crown shaped coating 36 on the air bearing surface 29 of the slider 20.

While RF diode sputtering is the preferred process for depositing the coating 36, any number of other methods which allow the placement of a continuous protective coating with the desired thickness and tolerances may be used. Such methods may include, but are not limited to: Chemical Vapor Deposition; or DC diode, DC magnetron, RF magnetron, or ion-beam sputtering.

Once again, it is noted that it is preferable in many situations to coat the air bearing surface 29 of the slider 20 with an adhesive material before deposition of the coating 36. In the preferred embodiment of the present invention, it is desired that a layer of adhesive material 39, be deposited in a crown shape with a maximum depth of 2 to 4 nm upon the air bearing surface 29 of the slider 20, as illustrated in FIG. 6.

When utilizing an adhesion layer 39, the bottom 24 of the slider 20 is first cleaned, as described above. Next, the adhesion layer source is cleaned.

It is preferred that the adhesive material is placed utilizing a mask, as described above. It is possible, however for a uniform adhesion layer 39 be deposited. Utilizing the above-identified equipment, and preferably the rotating substrate table, the following parameters are preferred to deposit the adhesion layer 39:

| Process atmospheric gas: | Argon; |
|---|---|
| Gas Pressure: | 9 to 12 milliTorr; |
| Power: | 400 to 600 Watts; and |
| Substrate voltage: | −20 to −100 Volts. |

After preparation of the adhesive coating 39, the coating 36 material is deposited, as described above.

Although this invention has been described in terms of certain preferred embodiments, other embodiments that are apparent to those of ordinary skill in the art are also within the scope of this invention. Accordingly, the scope of the invention is intended to be defined only by reference to the following claims.

We claim:

1. A slider, for use with a rotatable magnetic disk, said slider having an air-bearing surface with a carbon coating thereon, a first end, a second end, and a top surface, wherein said air bearing surface has a crown with a maximum crown height of said coated slider being at least as great as the diameter of a molecule of said carbon coating and less than 10 nm, further including an adhesive layer located on said air-bearing surface and under said carbon coating, said adhesive layer having a maximum thickness of greater than the diameter of a molecule of said adhesive layer and less than about 3 nm, said adhesive layer being electrically conductive.

2. The slider of claim 1, wherein said slider farther comprises a transducer element having a resistance component of characteristic impedance, and said adhesive layer has a resistance higher than said resistance component of characteristic impedance of said transducer element.

3. The slider of claim 2, wherein said resistance component of characteristic impedance of said transducer element is in the range of $10^4$–$10^6$ Ω.

4. The slider of claim 2, wherein said carbon coating has a thickness of about 0 nm at each end of said slider.

5. The slider of claim 4, wherein said air bearing surface is flat and said crown comprises carbon having a maximum thickness of less than 10 nm.

6. A slider for use with a rotatable magnetic disk, said slider having a first end and a second end, a top surface, an air-bearing surface, a first edge at the intersection of said first end with said air-bearing surface and a second edge at the intersection of said second end with said air-bearing surface, said air-bearing surface having a crown of continuous carbon coating thereon, said coating having a maximum distance of between 6 and 10 nm from a straight line connecting said first and second edges, further including an adhesive layer located on said air-bearing surface and under said carbon coating, said adhesive layer having a maximum thickness of at least the diameter of a molecule of said adhesive layer and less than about 3 nm, said adhesive layer being electrically conductive.

7. The slider of claim 6, wherein said maximum distance is less than 8 nm.

8. The slider of claim 6, wherein said slider further comprises a transducer element having a resistance component of characteristic impedance, and said adhesive layer has a resistance higher than said resistance component of characteristic impedance of said transducer element.

9. The slider of claim 8, wherein said resistance component of characteristic impedance of said transducer element is in the range of $10^4$–$10^6$ Ω.

10. The slider of claim 8, wherein said maximum distance is less than 8 nm.

11. A slider, for use with a rotatable magnetic disk, said slider having a first and second end, a top surface and an air-bearing surface, a first edge located at the intersection of said first end with said air-bearing surface and a second edge at the intersection of said second end with said air-bearing surface, said air-bearing surface having a carbon coating thereon which is thin at the first end of said slider, and which is thicker between said first and second ends, wherein the maximum distance of said coating is at least the diameter of a molecule of said carbon coating and no more than 10 nm from a straight line connecting said first and second edges, further including an adhesive layer located on said air-bearing surface and under said carbon coating, said adhesive layer having a maximum thickness of at least the diameter of a molecule of said adhesive layer and less than about 3 nm, said adhesive layer being electrically conductive.

12. The slider of claim 11, wherein said slider further comprises a transducer element having a resistance component of characteristic impedance, and said adhesive layer has a resistance higher than said resistance component of characteristic impedance of said transducer element.

13. The slider of claim 12, wherein said a resistance component of characteristic impedance of said transducer element is in the range of $10^4$–$10^6$ Ω.

14. The slider of claim 12, wherein said carbon coating is thin at said second end of said slider.

15. The slider of claim 12, wherein said maximum distance is no more than 6 nm.

16. The slider of claim 12, wherein said coating has a thickness of near 0 nm at said first end.

* * * * *

UNITED STATES PATENT AND TRADEMARK OFFICE
CERTIFICATE OF CORRECTION

PATENT NO. : 5,654,850
DATED : August 5, 1997
INVENTOR(S) : Ganapathi et al.

It is certified that error appears in the above-identified patent and that said Letters Patent is hereby corrected as shown below:

```
Column 1, Line 16, "cross-shaped", should read --crown-shaped--.
Column 1, Line 23, "of the the found", should read --of the type
    found--.
Column 11, line 66, "Figure T", should read --Figure 7--.
Column 13, line 31, "slider farther", should read --slider further--.
```

Signed and Sealed this

Seventeenth Day of February, 1998

*Attest:*

BRUCE LEHMAN

*Attesting Officer*   *Commissioner of Patents and Trademarks*